US012443472B2

(12) United States Patent
Jha et al.

(10) Patent No.: US 12,443,472 B2
(45) Date of Patent: Oct. 14, 2025

(54) INTERPROCESS SYSTEMS AND METHOD FOR BYPASSING UNAVAILABLE COMPONENTS IN A PROCESSING NETWORK

(71) Applicant: Truist Bank, Charlotte, NC (US)

(72) Inventors: Sanjeev Kumar Jha, Marietta, GA (US); Tekchand Prasad, Alpharetta, GA (US); Suresh Edupuganti, Marietta, GA (US)

(73) Assignee: Truist Bank, Charlotte, NC (US)

( * ) Notice: Subject to any disclaimer, the term of this patent is extended or adjusted under 35 U.S.C. 154(b) by 408 days.

(21) Appl. No.: 18/072,567

(22) Filed: Nov. 30, 2022

(65) Prior Publication Data

US 2024/0176686 A1 May 30, 2024

(51) Int. Cl.

*G06F 9/34* (2018.01)
*G06F 9/451* (2018.01)
*G06F 9/54* (2006.01)

(52) U.S. Cl.

CPC .............. *G06F 9/546* (2013.01); *G06F 9/451* (2018.02)

(58) Field of Classification Search

CPC ...... G06F 9/546; G06F 9/451; G06F 11/0706; G06F 11/0793

See application file for complete search history.

(56) References Cited

U.S. PATENT DOCUMENTS

2002/0165929 A1* 11/2002 McLaughlin ....... H04L 41/0803 709/213
2004/0078628 A1* 4/2004 Akamatu .............. G06F 9/4881 714/E11.132
2004/0243915 A1* 12/2004 Doyle ................. H04L 67/1034 714/E11.073
2005/0021771 A1* 1/2005 Kaehn ................... H04L 69/329 709/228
2007/0005801 A1* 1/2007 Kumar .................. H04L 67/565 709/238
2008/0225835 A1* 9/2008 Oda .................... H04L 65/1069 370/352
2012/0030326 A1* 2/2012 Cassidy ............ H04N 21/2385 709/223
2015/0074168 A1* 3/2015 Hartman ............... G06F 9/5005 709/201

(Continued)

*Primary Examiner* — Tuan C Dao

(74) *Attorney, Agent, or Firm* — Kilpatrick Townsend & Stockton LLP; Michael A. Springs, Esq.

(57) ABSTRACT

In a computer-implemented method, a processing device may receive an operation request from a channel. The processing device may process the operation request, which may contain one or more operations, which themselves may contain one or more instructions. The instructions may be executable by one or more components of the system. The processing device may detect that a first component among the components of the system is unavailable. The processing device may then bypass the first operations corresponding to the first component and store information associated with the first operations in a memory device. The processing device may execute the operations of the remaining components and transmit a message containing operation request result data. The processing device may detect a status change of the first component, retrieve the information associated with the first operations from the memory device, and then execute the first operations.

20 Claims, 5 Drawing Sheets

300

302
Receive, from a channel, an operation request

304
Process the operation request, the operation request comprising one or more operations, an operation comprising one or more instructions, the instructions executable by one or more components of the system 306
Detect that a first component of a plurality of components of the system is unavailable to process the operation request 308
Bypass first operations corresponding to the first component from the operation request 310
Store the information associated with the first operations in a memory device 312
Execute additional operations of additional components of the plurality of components of the system

FIG. 3B

(56) References Cited

U.S. PATENT DOCUMENTS

2019/0239137 A1* 8/2019 Zhuang ............... H04W 40/246
2020/0042647 A1* 2/2020 Pandey .................. G06N 20/00
2020/0162878 A1* 5/2020 Zhuang ................... H04W 4/40
2021/0058344 A1* 2/2021 Marsh .................... G06Q 50/06
2022/0122039 A1* 4/2022 Byon .................. G06F 11/0766

* cited by examiner

INTERPROCESS SYSTEMS AND METHOD FOR BYPASSING UNAVAILABLE COMPONENTS IN A PROCESSING NETWORK

TECHNICAL FIELD

The present disclosure relates generally to interprocess communications and, more particularly (although not necessarily exclusively), to processing operation requests from a channel.

BACKGROUND

In some examples, a processing network may receive an operation request from a channel, specifying operations to be completed by a number of different components that make up the processing network. The processing network may route one or more operations to the components through various types of interprocess communications, for instance, a message queue, a socket, or a remote procedure call (RPC). If one of the components is unavailable, for example, due to a network outage or an operating system crash, it may be impossible to complete the operation request. In that case, the processing network may notify the channel that the operation request has failed and may be retried later when the component becomes available, resulting in an unexpected outcome or loss of efficiency from the standpoint of a user of the channel.

SUMMARY

In one example, a system includes a processing device and a memory device that includes instructions executable by the processing device for causing the processing device to perform operations including receiving, from a channel, an operation request; processing the operation request, the operation request containing one or more operations, an operation including one or more instructions, the instructions executable by one or more components of the system; detecting that a first component of a plurality of components of the system is unavailable to process the operation request; bypassing first operations corresponding to the first component from the operation request; storing information associated with the first operations in a memory device; executing additional operations of additional components of the plurality of components of the system; transmitting, to the channel, a message including one or more operation request result data; detecting a status change of the first component; retrieving the information associated with the first operations from the memory device; and executing the first operations.

In another example, a computer-implemented method includes receiving, from a channel, an operation request; processing the operation request, the operation request containing one or more operations, an operation including one or more instructions, the instructions executable by one or more components of the system; detecting that a first component of a plurality of components of the system is unavailable to process the operation request; bypassing first operations corresponding to the first component from the operation request; storing information associated with the first operations in a memory device; executing additional operations of additional components of the plurality of components of the system; transmitting, to the channel, a message including one or more operation request result data; detecting a status change of the first component; retrieving the information associated with the first operations from the memory device; and executing the first operations.

In another example, a non-transitory computer-readable medium including instructions that are executable by a processing device for performing operations. The operations include receiving, from a channel, an operation request; processing the operation request, the operation request containing one or more operations, an operation including one or more instructions, the instructions executable by one or more components of the system; detecting that a first component of a plurality of components of the system is unavailable to process the operation request; bypassing first operations corresponding to the first component from the operation request; storing information associated with the first operations in a memory device; executing additional operations of additional components of the plurality of components of the system; transmitting, to the channel, a message including one or more operation request result data; detecting a status change of the first component; retrieving the information associated with the first operations from the memory device; and executing the first operations.

DETAILED DESCRIPTION

Figure 1:
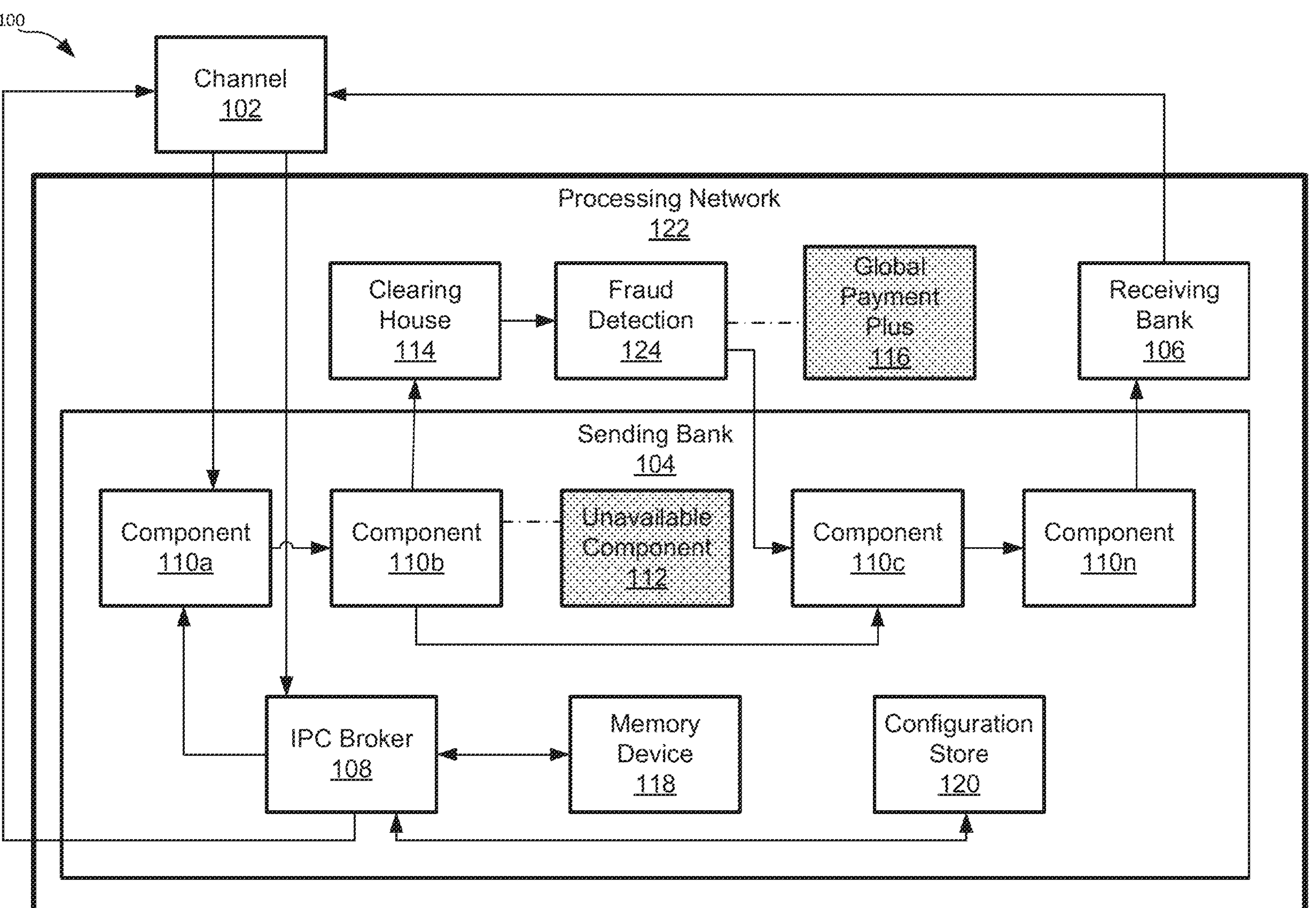
FIG. 1 is a schematic of an example of a system that can bypass operations, according to one example of the present disclosure.

Certain aspects and examples of the present disclosure relate to a system and method for bypassing certain operations, such as an operation request from a channel that corresponds to an unavailable component in a processing network. In an example, a user of a channel may rely upon one or more operations on a processing network. The channel may be, for example, a remote process running outside the processing network. The user may submit a request for one or more operations through the channel. The operations may correspond to one or more components of the processing network. The operations each include one or more instructions, which are executable by the components of the processing network. Continuing with the example of a remote process operating outside the processing network, the remote process may send an operation request including a computation operation, a storage operation, an interprocess operation, and an output operation. Each operation comprises instructions that are executable by certain components of the processing network. For instance, the storage operation may contain instructions to store or retrieve data from a database.

In an additional example, the processing network detects, using interprocess communications, that a component corresponding to the operation request is unavailable. For example, the processing network may attempt a remote procedure call or may access one or more configuration parameters stored in a shared memory device to determine the availability of a component. The processing network may utilize an interprocess communications (IPC) broker to determine the availability of a component. In this example, upon detecting that a component is unavailable, the operation request may proceed by bypassing the operations corresponding to the unavailable component and completing the operation request. The processing network may store information associated with the bypassed operations in a memory device. For example, information associated with the bypassed operations may be stored in a database or a message queue. Despite the fact that the operations of the unavailable component were bypassed, the processing network transmits to the channel a message indicating completion of the operation request. The message may contain data identifying completed portions of the operation request. At a later time, the processing network may detect that the unavailable component has changed status and become available through some types of interprocess communications. For instance, the IPC broker may utilize shared memory or execute a remote method invocation to detect the availability of the previously unavailable component. The processing network may retrieve the information associated with the bypassed operations stored in the memory device and execute those operations on the component, which is now available. For example, the processing network could retrieve the information associated with the bypassed operations from a message queue. In this example, the user of the channel is able to complete the operation request despite the unavailability of one or more components, thus improving efficiency and ensuring that the user does not see an unexpected result. Moreover, the operator of the processing network may be better assured of the system's resiliency by the methods of the present disclosure and thereby maximize uptime.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an example of a system 100 that can bypass certain operations. The operations can include an operation request from a channel 102 that is an unavailable component 112. The system 100 may include a channel 102 and a processing network 122. The channel 102 may be a remote process or it may be an internal process with respect to the processing network 122. For instance, the channel 102 may be an application running on a device external to the processing network 122, such as a personal computer or smartphone. In some examples, the channel 102 may be a component 110 in the processing network 122. The channel 102 generates operation requests for the processing network 122 to perform one or more operations. The operations may correspond to one or more components 110 that make up the processing network 122. The processing network 122 may comprise components 110 internal to a computing system, components 110 that are remotely communicatively coupled over a network, or both. For instance, the processing network 122 may include an external operations processing platform that is communicatively coupled to components 110 over a network. The operation request may include one or more instructions that are executable by the components 110 of the processing network 122.

The processing network 122 may include an interprocess communications (IPC) broker 108. The IPC broker 108 receives operation requests from the channel 102 and transmits the operations to the one or more components 110 according to the availability of those components 110. For instance, the IPC broker 108 may be implemented as a message queue. In some examples, the IPC broker 108 may be implemented as a shared memory device. In some examples, the IPC broker 108 may be implemented by executing program code according to data stored in a configuration store 120.

In some examples, the operations included in the operation request are performed according to a specified order. The IPC broker 108 transmits the operations to the components 110 according to the availability of those components 110 and the operation request. For example, the first operation may be executed by component 110*a*, the second operation may be executed by component 110*b*, and so on, ending with the final component 110*n*. Upon completion of the operation request, the IPC broker 108 may send data to the channel 102 indicating the operation request has completed. In some examples, the operations included in the operation request may be performed in any order, but all of the specified components 110 may be required to be available for the operation request to complete.

In some examples, an operation request from the channel 102 may include operations directed to an unavailable component 112. For example, the unavailable component 112 may be unavailable due to software bug, network error, operating system crash, or hardware failure. In the absence of an IPC broker 108, it may be necessary under these circumstances to send data to the channel 102 indicating that the operation request cannot proceed or has failed. This would be true even if the operation request could have completed without the unavailable component 112. For example, in some cases the operations directed to the unavailable component 112 could be performed after the operation request is complete, when the unavailable component 112 becomes available.

Prior to transmitting the operations to the components 110, the IPC broker 108 may detect an unavailable component 112. For instance, data regarding the unavailability of the component 112 may be contained in a configuration store 120. In some examples, the unavailable component 112 may be detected by way of a remote procedure call, remote method invocation, or lack of "heartbeat." In some other examples, the unavailable component 112 may be detected by way of messages sent by the unavailable component 112 to a message queue. If the IPC broker 108 detects one or more unavailable components 112, it may still transmit the operations to the components 110 that are available. In essence, the unavailable component 112 is bypassed or "stubbed out" as the operation request completes.

For example, the first operation may be executed by component 110*a* and the second operation may be executed by component 110*b*. Unavailable component 112 is bypassed or "stubbed out." The third operation may be executed by component 110*c* and the last operation may be executed by component 110*n*. In particular, the third operation may be executed by component 110*c* even though, under normal circumstances, the previous component to execute an operation would have been the unavailable component 112. Because the IPC broker 108 has detected the unavailable component 112 and bypassed the unavailable component 112, the third operation may execute on component 110*c*, rather than unavailable component 112, after the second operation executes on component 110*b*. The IPC broker 108 may bypass the unavailable component 112 and cause the third operation to be executed by component

110*c* even though the third operation and the operations associated with the unavailable component 112 are distinct. In other words, the nature of the operations associated with a particular component 110 may not affect the ability of the system 100 to bypass unavailable components 112. Upon completion of the operation request, the IPC broker 108 may send data to the channel 102 indicating the operation request has completed, despite the fact that one component 112 was unavailable. The data may indicate that the operation request has completed, but the operations corresponding to the unavailable component 112 are still pending. In some examples, a plurality of components 112 may be unavailable. In that case, the IPC broker 108 may proceed as before by detecting the unavailable components 112, transmitting the operations to the components 110 that are available, and bypassing the unavailable components 112 such that the operation request still completes. As above, while the operation request is complete, the operations corresponding to the unavailable components 112 are still pending and will be executed upon the availability of the unavailable component 112.

In some examples, the IPC broker 108 may store the information associated with the bypassed operations corresponding to the unavailable component 112 in a memory device 118, for example a database, during the execution of the operation request. In one embodiment, the operations include one or more instructions for one or more components, and so can be stored in the memory device 118 as timestamped instructions to be executed at a later time. In some embodiments, the information associated with the bypassed operations may be stored according to a suitable mapping scheme. Later, after the operation request has completed and the channel 102 has received data indicating that the operation request is complete, the IPC broker 108 may detect that the unavailable component 112 has become available. The IPC broker 108 may retrieve the operations from the memory device 118 and execute the operations on the unavailable component 112, which is now available. In other examples, the memory device 118 is a message-queue file stored on a filesystem, volatile RAM, or other suitable location for storing operations for an unavailable component 112 to be executed at a later time.

In some embodiments, the processing network includes a sending bank 104 and a receiving bank 106. The channel 102 may be a real-time payment application running on a personal computer, smartphone, or other computing system. The operation request may be, for example, a payment processing request. The payment processing request may contain one or more operations directing the sending bank 104 to send a payment to a receiving bank 106. The example shown in FIG. 1 illustrates many of the components 110 of the sending bank 104, but the receiving bank 106 may have a similar array of components 110, which may be bypassed according to the detection of unavailable components 112 by an IPC broker 108.

The one or more operations in the payment processing request may be directed to one or more components 110 in the payment processing network 122, which contains the sending bank 104 and the receiving bank 106. The one or more components may include a clearing house component 114 and a global payment plus component 116. In some examples, the global payment plus component 116 is used for "hard posting" of the payment processing request. Hard posting may correspond to the settlement of accounts corresponding to the payment processing request. In the event the global payment plus component 116 is unavailable, the payment processing request can still complete by bypassing the global payment plus component 116. In this example, the channel 102 continues to operate and receives data indicating that the payment processing request has completed. However, because the global payment plus component 116 is unavailable, the payment is not successful but has nevertheless been processed. As described above, the information associated with the bypassed operations associated with the unavailable global payment plus component 116 may be stored in a memory device 118 and executed later, when the global payment plus component 116 becomes available.

In some embodiments, the operation request may be an incoming payment processing request. The operations of the payment processing request correspond to components 110 of the receiving bank 106 receiving funds from a sending bank 104. In this example, the receiving bank 106 may have one or more components unavailable 112. The receiving bank 106 may still process the incoming payment processing request by bypassing the unavailable component 112 and subsequently return data to the requesting channel 102 indicating that the payment processing request has been completed. For example, the unavailable component 112 may be the global payment plus 116 component, but other components 110 may be unavailable and still result in a completed incoming payment processing request.

In another example, the operation request may be an outgoing operation request. In some examples, the outgoing operation request is an outgoing payment processing request. In this example, the operations of the payment processing request correspond to components 110 of a sending bank 104 sending funds to a receiving bank 106. In this example, the sending bank 104 may have one or more components unavailable 112. The sending bank 104 may still process the outgoing payment processing request by bypassing the unavailable component 112 and return data to the requesting channel 102 indicating that the outgoing payment processing request has been completed. For example, the unavailable component 112 may be the global payment plus 116 component, but other components 110 may be unavailable and still result in a completed outgoing payment processing request.

In other examples, certain unavailable components 112 may result in halting of the processing of the outgoing payment processing request. For instance, if the unavailable component 112 is a fraud detection component 124, processing of the outgoing payment request may be halted. In this example, the IPC broker 108 may transmit a channel unavailability message to the channel 102 indicating that the channel is unavailable. The channel 102 is "stubbed out" in this example, resulting in a user of the channel 102 receiving a suitable message indicating the status of the channel 102 rather than an error message. In this case, the system 100 may provide alternative processing methods to the user of the channel. For example, if the channel 102 is a real-time payment processing channel, the user may still be able to submit payment processing requests using ACH or wire transfer channels.

Figure 2:
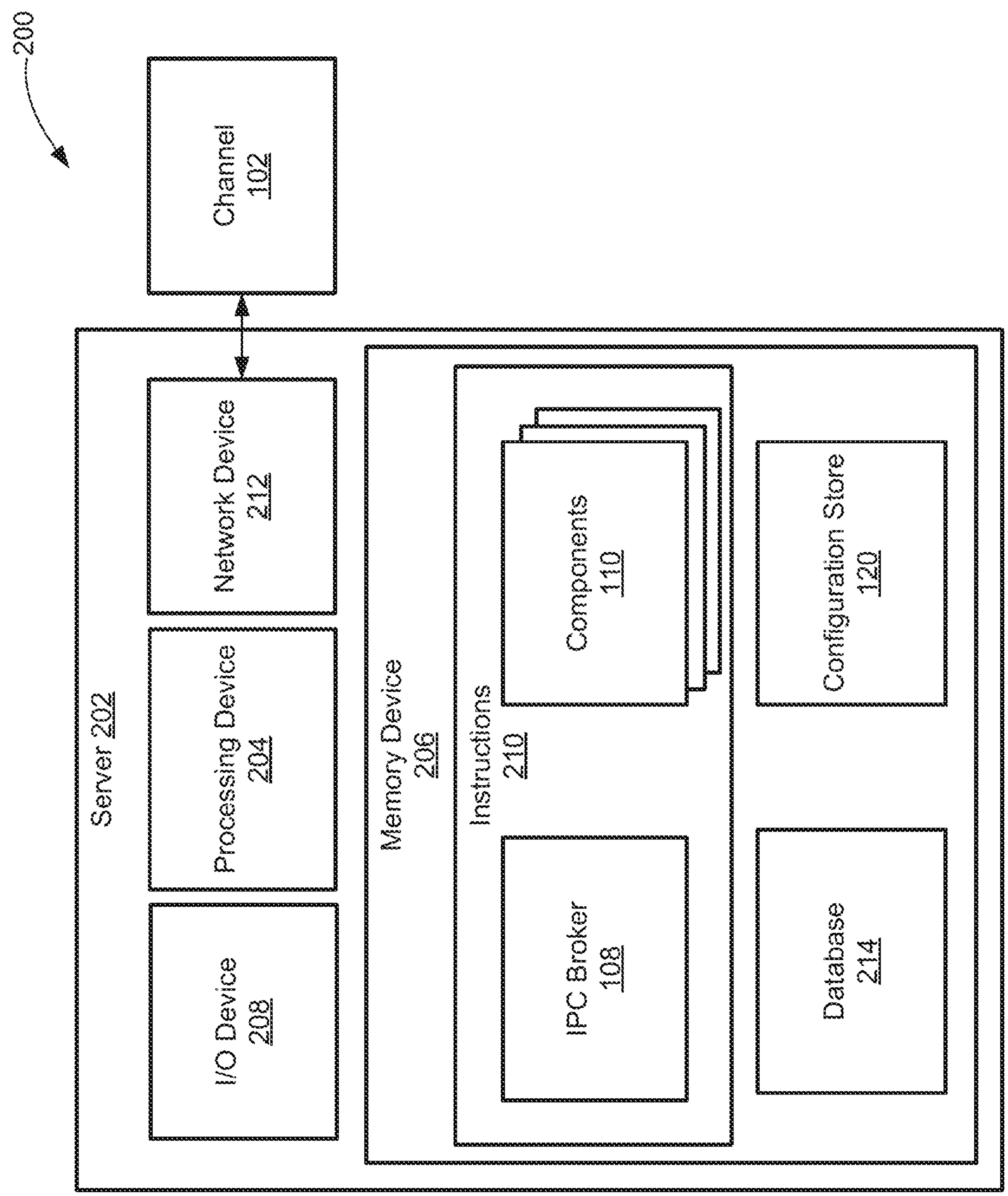
FIG. 2 is a block diagram of an example of a system for bypassing operations, according to one example of the present disclosure.

FIG. 2 is a block diagram of an example of a system 200 for bypassing operations according to one example of the present disclosure. The system 200 includes a processing device 204 that is communicatively coupled to a memory device 206. In some examples, the processing device 204 and the memory device 206 can be part of the same computing device, such as the server 202. In other examples, the processing device 204 and the memory device 206 can be distributed from (e.g., remote to) one another. For instance, the memory device 206 may be hosted by a cloud storage provider.

The processing device 204 can include one processor or multiple processors. Non-limiting examples of the processing device 204 include a Field-Programmable Gate Array (FPGA), an application-specific integrated circuit (ASIC), or a microprocessor. The processing device 204 can execute instructions 210 stored in the memory device 206 to perform operations. The instructions 210 may include processor-specific instructions generated by a compiler or an interpreter from code written in any suitable computer-programming language, such as C, C++, C#, Java, or Python.

The memory device 206 can include one memory or multiple memories. The memory device 206 can be volatile or non-volatile. Non-volatile memory includes any type of memory that retains stored information when powered off. Examples of the memory device 206 include electrically erasable and programmable read-only memory (EEPROM) or flash memory. At least some of the memory device 206 can include a non-transitory computer-readable medium from which the processing device 204 can read instructions 210. A non-transitory computer-readable medium can include electronic, optical, magnetic, or other storage devices capable of providing the processing device 204 with computer-readable instructions or other program code. Examples of a non-transitory computer-readable medium can include a magnetic disk, a memory chip, ROM, random-access memory (RAM), an ASIC, a configured processor, and optical storage.

The processing device 204 may also be communicatively coupled to an I/O device 208 for displaying, for example, a user interface that may be operated to configure the system 200. The I/O device 208 may also include any suitable device for configuring the system 200, for instance, a keyboard or mouse. The processing device 204 may also be communicatively coupled to a network device 212 for communicating with and among other devices in the system 200 over a network. In some examples, the network device 212 is a network interface card. In other examples, the network device 212 may be a virtual network interface implemented in software. The network may include all or part of multiple networks, including the Internet, a LAN, a WAN, wireless network, cellular network, or the like.

The processing device 204 can execute the instructions 210 to perform operations. The instructions 210 may include program code for operating an IPC broker 108 and one or more components 110. For example, in accordance with the example from FIG. 1, the processing device 204 can receive, via the network device 212, an operation request from a channel 102. The IPC broker 108 may detect, using the processing device 204, that one or more components 110 are unavailable. Alternatively, the IPC broker 108 may detect that one or more components 110 are unavailable according to the configuration store 120 or according to input received from the I/O device 208, for example, from a user interface, which may be used to operate the system 200. The IPC broker 108 may then bypass the operations included in the operation request, which correspond to the unavailable component 112. The IPC broker 108 may store in the database 214, or other suitable memory device 206, the information associated with the bypassed operations associated with the unavailable component 112.

Figure 3A:
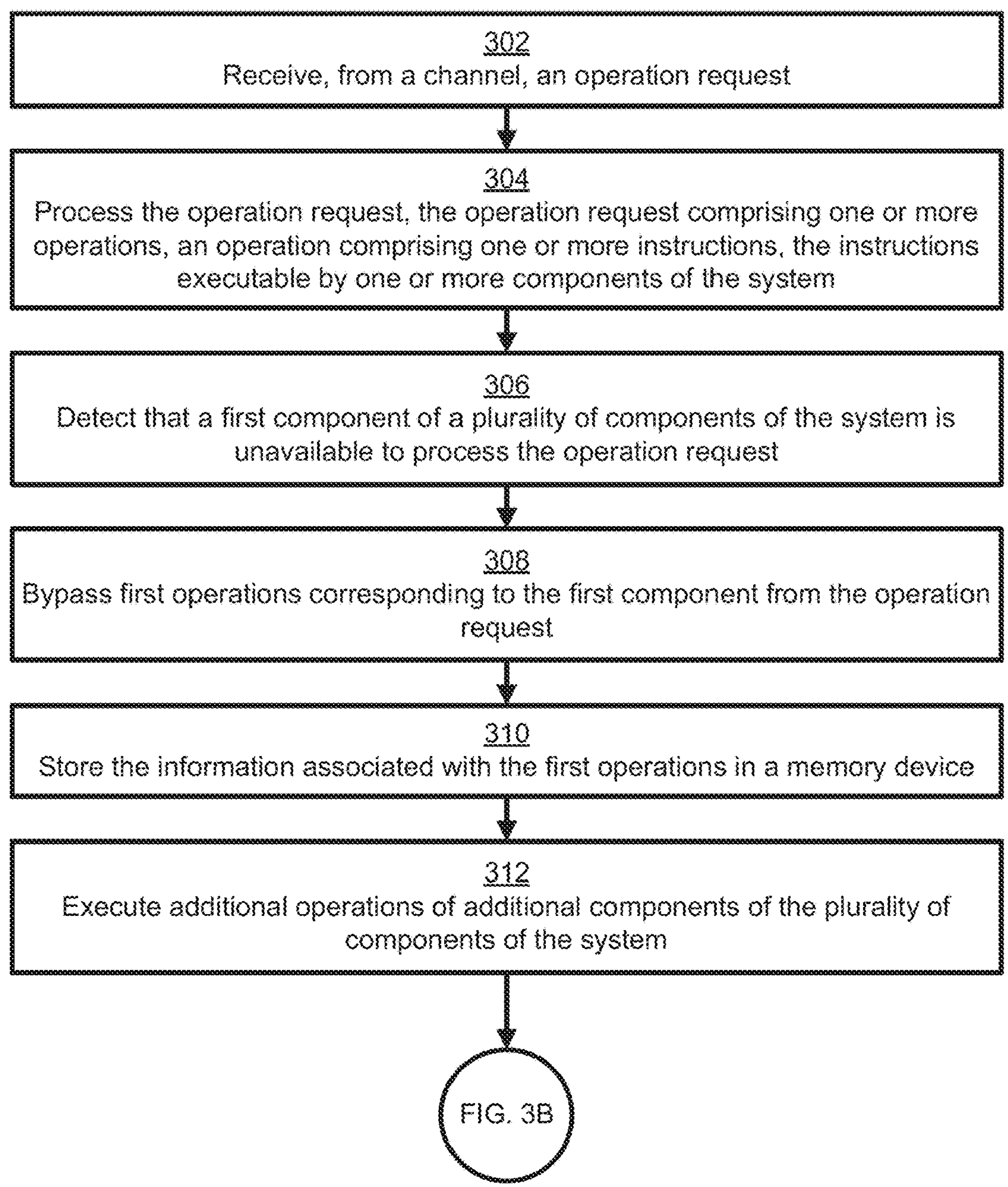
FIGS. 3A-3B depict a flowchart of a process for bypassing operations, according to one example of the present disclosure.
Figure 3B:
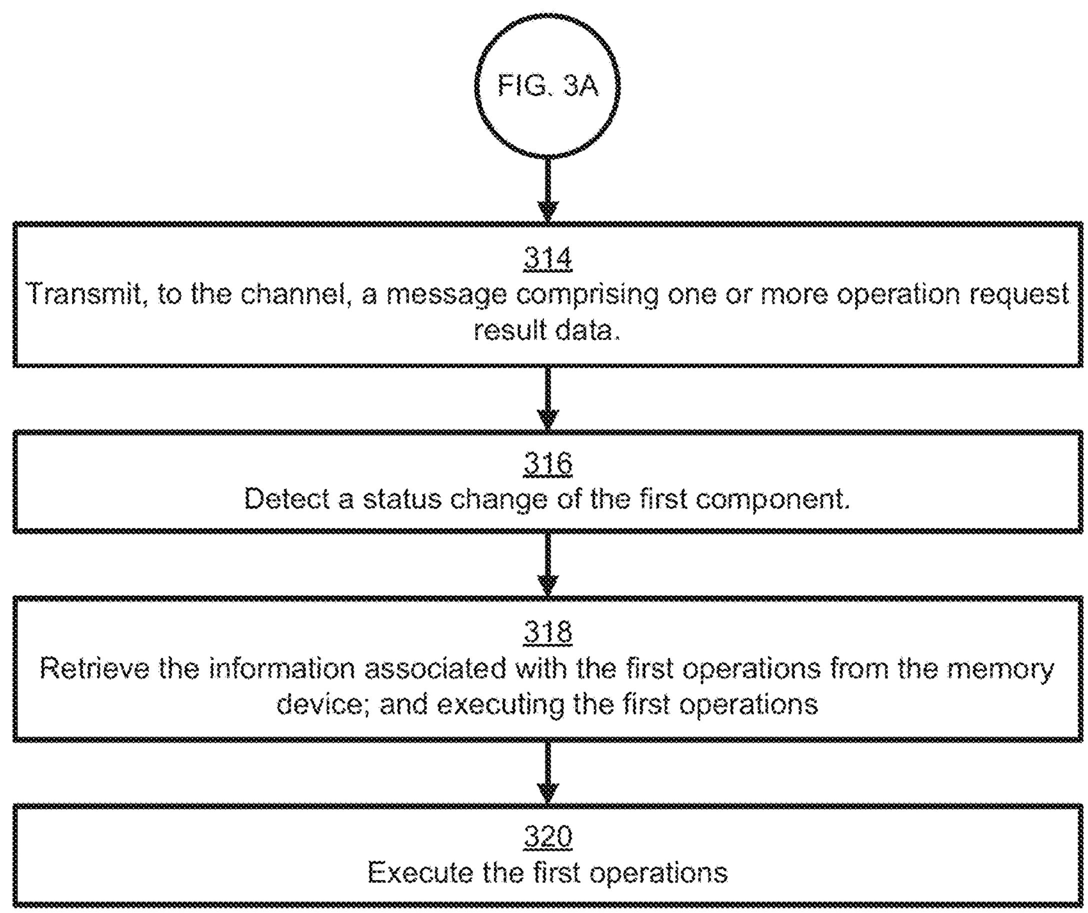

FIGS. 3A-3B depict a flowchart of a process 300 for bypassing operations included in an operation request from a channel, which correspond to an unavailable component in a processing network according to one aspect of the present disclosure. In some examples, the processing device 204 can implement some or all of the blocks shown in FIGS. 3A-3B. The processing device 204 can implement some or all blocks according to program code operating other components, for example, an IPC broker 108. Other examples can include more blocks, fewer blocks, different blocks, or a different order of the blocks than is shown in FIGS. 3A-3B. The blocks of FIGS. 3A-3B are discussed below with reference to the components discussed above in relation to FIGS. 1 and 2.

At block 302, the processing device 204 can receive, from a channel 102, an operation request. The operation request may include one or more instructions that are executable by one or more components 110 of a processing network 122.

At block 304, the processing device 204 can process the operation request, the operation request including one or more operations, an operation including one or more instructions, the instructions executable by one or more components 110 of the system. In some examples, the operation request is processed by an IPC broker 108. The IPC broker 108 transmits the operations to the one or more components 110 according to the availability of those components 110.

At block 306, the processing device 204 may detect that a first component 112 of a plurality of components 110 of the system is unavailable to process the operation request. Detecting the unavailability of the first component 112 may be performed by the IPC broker 108. For instance, data regarding the unavailability of the first component 112 may be contained in a configuration store 120. In some examples, the unavailable component 112 may be detected by way of a remote procedure call, remote method invocation, or lack of "heartbeat." In some other examples, the unavailable component 112 may be detected by way of messages sent by the unavailable component 112 to a message queue.

At block 308, the processing device 204 can bypass first operations corresponding to the first component 112 from the operation request. The IPC broker 108 may perform the bypassing of the first component 112, for example, using data from a configuration store 120 or other suitable mechanism.

At block 310, the processing device 204 can store the information associated with the first operations in a memory device 118. For example, the memory device 118 may be a database, message queue, file on a filesystem, or other suitable storage location. The IPC broker 108 may perform the storing the first operations. Alternatively, the unavailable component 112 may receive the operations and store them for later execution in an internal memory location.

At block 312, the processing device 204 can execute additional operations of additional components of the plurality of components of the system. As mentioned previously, the IPC broker 108 transmits the operations to the one or more components 110 according to the availability of those components 110. The operations on the available components 110 may execute in a specified order or in any order, according to the operation request.

At block 314, the processing device 204 can transmit, to the channel 102, a message that includes one or more operation request result data. The message may include details about the unavailable component 112 as well as the components 110 that did execute. The message does not necessarily indicate successful completion of the desired operation request.

At block 316, the processing device 204 can detect a status change of the first component. For instance, the IPC broker 108 may detect that the unavailable component 112 has become available. Data regarding the availability of the first component 112 may be updated in a configuration store 120. In some examples, the first component 112 may be detected by way of a remote procedure call, remote method invocation, or presence of a "heartbeat." In some other examples, the first component 112 may be detected by way of messages sent by the first component 112 to a message queue.

At block 318, the processing device 204 can retrieve the information associated with the first operations from the memory device 118. For instance, the IPC broker 108 may retrieve the information associated with the stored operations from a database or message queue, as described in block 310.

At block 320, the processing device 204 can execute the first operations. The IPC broker 108 may transmit operations to the available components 110, now including operations for the first component 112. These operations may be executed by the first component 112, even though the operation request is complete and the message has been sent to the channel 102 containing operation request result data.

Figure 4:
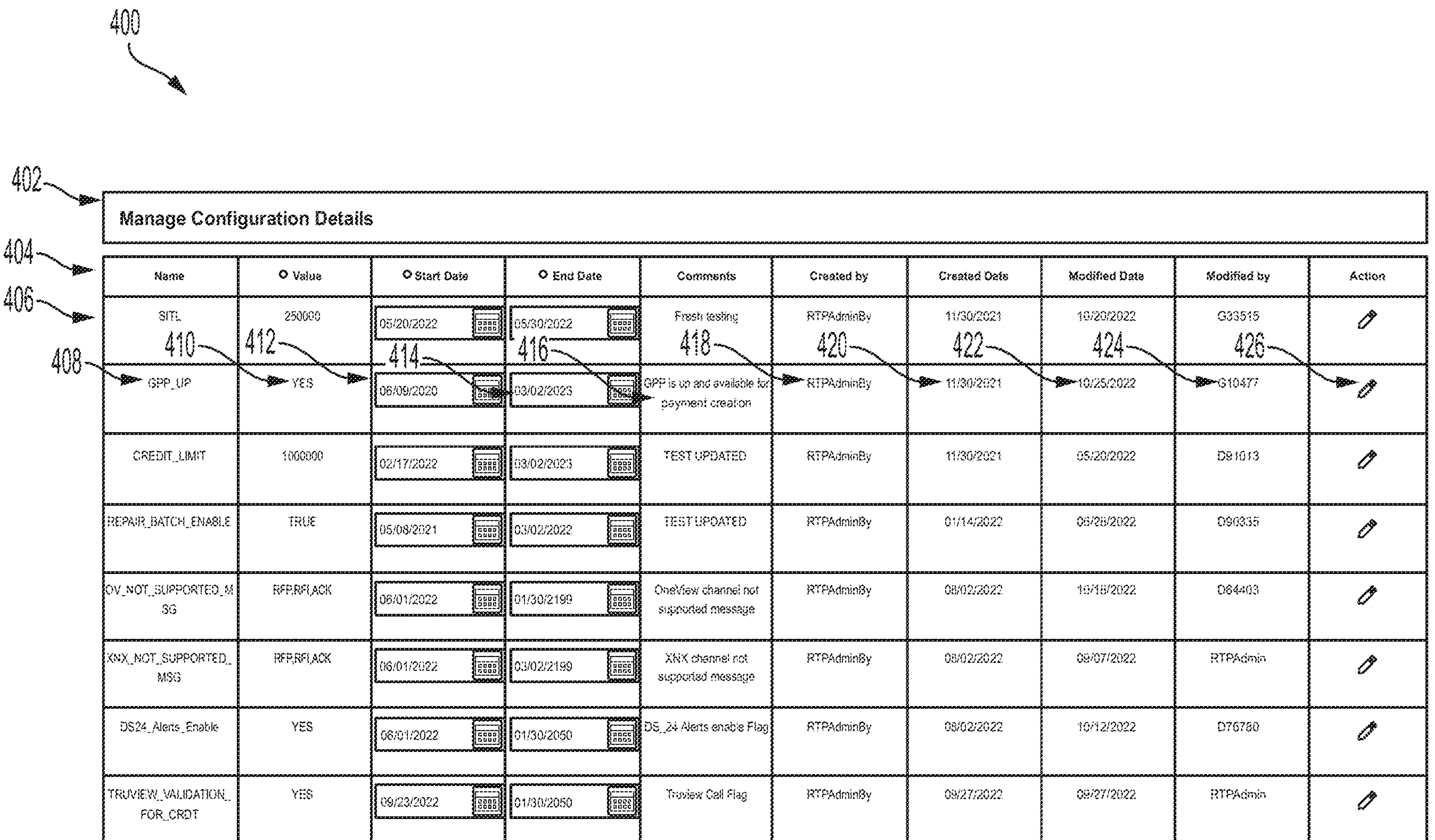
FIG. 4 is an illustration of a user interface of an example system for bypassing operation requests in a processing network, according to one example of the present disclosure.

FIG. 4 is an illustration of a user interface of an example application 400 included in a system 100 for bypassing operation requests in a processing network 122. In some examples, the user interface is displayed by the system 200 on an I/O device 208, for example, a computer monitor. The application 400 may be used to operate the system 100. For example, prior to transmitting the operations to the components 110, the IPC broker 108 may detect the unavailable component 112. Data regarding the unavailability of the component 112 may be contained in a configuration store 120. The configuration store 120 may be operated using an application 400 with a suitable user interface.

The application 400 may include a manage configuration details function 402. The manage configuration details function 402 may include columnar configuration data 404 for the system 100. For instance, the manage configuration details function 402 may include configuration data 404 like configuration parameter name, value, or others. The configuration data 404 corresponding to unavailable components 112 may include a name, identifying a parameter 408. The configuration data 404 may be arranged in one or more rows 406 of data, but other visual presentations are possible. The rows 406 may comprise a system component list. For example, the configuration parameter named "GPP_UP" 408 may be a Boolean parameter corresponding to a component. In this example, the parameter 408 may correspond to the global payments plus component 116. The parameter 408 may have two Boolean values 410, for example, "YES" as shown in FIG. 4, or "NO." The parameter 408 may be bounded in time with a start time 412 or an end time 414. The start time 412 and end time 414 may be set with a calendar widget and may include both dates and times. The application 400 may allow the application user to associate a comment 416 with the parameter 408. The application may indicate the user 418 who created the parameter 408, as well as the date 420 on which the user 418 created the parameter 408. The application 400 may allow the user to make modifications to the parameter 408 after it has been created. The application may indicate the user 424 who modified the parameter 408, as well as the date 422 on which the user 418 modified the parameter 408. The application 400 may include an action selector 426, for example, for modifying or deleting the parameter 408.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
- a processing device; and
- a memory device that includes instructions executable by the processing device for causing the processing device to perform operations comprising:
  - receiving, from a user interface, a plurality of configuration parameters associated with one or more components of the system;
  - receiving, from a channel, an operation request;
  - processing the operation request, the operation request comprising one or more component operations, each component operation of the one or more component operations comprising one or more component instructions, the one or more component instructions executable by the one or more components of the system;
  - detecting that a first component of a plurality of components of the system is unavailable to process the operation request;
  - bypassing first component operations corresponding to the first component from the operation request, comprising:
    - accessing one or more first configuration parameters associated with the first component from the memory device, wherein the one or more first configuration parameters are Boolean parameters included in first component instructions for the first component operations and have an associated start time and end time;
    - determining that the current time falls between the associated start time and end time for the first configuration parameters; and
    - responsive to determining that the current time falls between the associated start time and end time, bypassing the first component instructions for the first component operations based on the one or more first configuration parameters;
  - storing information associated with the first component operations in the memory device;
  - executing additional component operations of additional components of the plurality of components of the system;
  - transmitting, to the channel, a message comprising one or more operation request result data;
  - detecting a status change of the first component;
  - updating the one or more first configuration parameters;
  - retrieving the information associated with the first component operations from the memory device; and
  - executing the first component operations, comprising:
    - accessing the updated one or more first configuration parameters for the first component from the memory device; and
    - executing the first component instructions of the first component operations based on the updated one or more first configuration parameters.

2. The system of claim 1, wherein the first component is an external operations processing platform.

3. The system of claim 1, wherein processing the operation request further comprises:
- detecting that a second component of the plurality of components of the system is unavailable to process the operation request; and
- bypassing second component operations corresponding to the second component from the operation request.

4. The system of claim 1, wherein the operation request is an outgoing operation request, and wherein the component operations further comprise:

halting the processing of the operation request; and transmitting, to the channel, a channel unavailability message.

5. The system of claim 4, wherein the first component is a fraud detection component.

6. The system of claim 1, wherein receiving, from the user interface, the plurality of configuration parameters associated with the one or more components of the system comprises receiving, from the user interface, the first configuration parameters associated with the first component, comprising:

providing, to the user interface, a system component list;

receiving an indication of a selection of the first component;

configuring the first component using the first configuration parameters;

storing the first configuration parameters in the memory device; and updating the user interface, wherein the first component is identified as unavailable.

7. The system of claim 6, wherein executing the additional component operations of the additional components of the plurality of components of the system comprises:

accessing the one or more configuration parameters from the memory device; and executing the component instructions of the component operations using the one or more configuration parameters.

8. A computer-implemented method comprising:

receiving, from a user interface, a plurality of configuration parameters associated with one or more components of a processing network receiving, from a channel, an operation request;

processing the operation request, the operation request comprising one or more component operations, each component operation of the one or more component operations comprising one or more component instructions, the one or more component instructions executable by the one or more components of the processing network;

detecting that a first component of a plurality of components of the processing network is unavailable to process the operation request;

bypassing first component operations corresponding to the first component from the operation request, comprising:

accessing one or more first configuration parameters associated with the first component from a memory device, wherein the one or more first configuration parameters are Boolean parameters included in first component instructions for the first component operations and have an associated start time and end time;

determining that the current time falls between the associated start time and end time for the first configuration parameters; and responsive to determining that the current time falls between the associated start time and end time, bypassing the first component instructions for the first component operations based on the one or more first configuration parameters;

storing information associated with the first component operations in the memory device;

executing additional component operations of additional components of the plurality of components of the processing network;

transmitting, to the channel, a message comprising one or more operation request result data;

detecting a status change of the first component;

updating the one or more first configuration parameters;

retrieving the information associated with the first component operations from the memory device; and executing the first component operations, comprising:

accessing the updated one or more first configuration parameters for the first component from the memory device; and executing the first component instructions of the first component operations based on the updated one or more first configuration parameters.

9. The method of claim 8, wherein the first component is an external operations processing platform.

10. The method of claim 8, wherein processing the operation request further comprises:

detecting that a second component of the plurality of components of the processing network is unavailable to process the operation request; and bypassing second component operations corresponding to the second component from the operation request.

11. The method of claim 8, wherein the operation request is an outgoing operation request, and wherein the component operations further comprise:

halting the processing of the operation request; and transmitting, to the channel, a channel unavailability message.

12. The method of claim 11, wherein the first component is a fraud detection component.

13. The method of claim 8, wherein receiving, from the user interface, the plurality of configuration parameters associated with the one or more components of the processing network comprises receiving, from the user interface, the first configuration parameters associated with the first component, comprising:

providing, to the user interface, a system component list;

receiving an indication of a selection of the first component;

configuring the first component using the first configuration parameters;

storing the first configuration parameters in the memory device; and updating the user interface, wherein the first component is identified as unavailable.

14. The method of claim 13, wherein executing the additional component operations of the additional components of the plurality of components of the processing network comprises:

accessing the one or more configuration parameters from the memory device; and executing the component instructions of the component operations using the one or more configuration parameters.

15. A non-transitory computer-readable medium comprising instructions that are executable by a processing device for causing the processing device to perform operations comprising:

receiving, from a user interface, a plurality of configuration parameters associated with one or more components of a processing network;

receiving, from a channel, an operation request;

processing the operation request, the operation request comprising one or more component operations, each component operation of the one or more component operations comprising one or more component instructions, the one or more component instructions executable by the one or more components of the processing network;

detecting that a first component of a plurality of components of the processing network is unavailable to process the operation request;

bypassing first component operations corresponding to the first component from the operation request, comprising:

accessing one or more first configuration parameters associated with the first component from a memory device, wherein the one or more first configuration parameters are Boolean parameters included in first component instructions for the first component operations and have an associated start time and end time;

determining that the current time falls between the associated start time and end time for the first configuration parameters; and responsive to determining that the current time falls between the associated start time and end time, bypassing the first component instructions for the first component operations based on the one or more first configuration parameters;

storing information associated with the first component operations in the memory device;

executing additional component operations of additional components of the plurality of components of the processing network;

transmitting, to the channel, a message comprising one or more operation request result data;

detecting a status change of the first component;

updating the one or more first configuration parameters;

retrieving the information associated with the first component operations from the memory device; and executing the first component operations, comprising:

accessing the updated one or more first configuration parameters for the first component from the memory device; and executing the first component instructions of the first component operations based on the updated one or more first configuration parameters.

16. The non-transitory computer-readable medium of claim 15, wherein the first component is an external operations processing platform.

17. The non-transitory computer-readable medium of claim 15, wherein processing the operation request comprises:

detecting that a second component of the plurality of components of the processing network is unavailable to process the operation request; and bypassing second component operations corresponding to the second component from the operation request.

18. The non-transitory computer-readable medium of claim 15, wherein the operation request is an outgoing operation request, and wherein the component operations further comprise:

halting the processing of the operation request; and transmitting, to the channel, a channel unavailability message.

19. The non-transitory computer-readable medium of claim 18, wherein the first component is a fraud detection component.

20. The non-transitory computer-readable medium of claim 15, wherein the receiving, from the user interface, the plurality of configuration parameters associated with the one or more components of the processing network comprises receiving, from the user interface, the first configuration parameters associated with the first component, comprising:

providing, to the user interface, a system component list;

receiving an indication of a selection of the first component;

configuring the first component using the first configuration parameters;

storing the first configuration parameters in the memory device; and updating the user interface, wherein the first component is identified as unavailable.

* * * * *